(12) United States Patent
Alvarez (10) Patent No.: US 6,238,354 B1
(45) Date of Patent: May 29, 2001

(54) TEMPERATURE MONITORING ASSEMBLY

(76) Inventor: Martin A. Alvarez, 7335 SW. 113th Circle Pl., Miami, FL (US) 33173

( * ) Notice: Subject to any disclaimer, the term of this patent is extended or adjusted under 35 U.S.C. 154(b) by 0 days.

(21) Appl. No.: 09/359,400

(22) Filed: Jul. 23, 1999

(51) Int. Cl.[7] .................................................... A61B 5/00
(52) U.S. Cl. ........................ 600/549; 600/300; 374/100
(58) Field of Search .................................. 600/474, 300, 600/549; 374/100, 141, 152

(56) References Cited

U.S. PATENT DOCUMENTS

| 4,151,931 | 5/1979 | Lester | 128/736 |
|---|---|---|---|
| 4,178,916 | * 12/1979 | McNamara | 600/549 |
| 4,246,784 | 1/1981 | Bowen | 73/339 D |
| 4,321,933 | 3/1982 | Baessler | 128/736 |
| 4,450,843 | 5/1984 | Barney et al. | 128/670 |
| 4,471,354 | 9/1984 | Smith | 340/870.17 |
| 4,509,531 | * 4/1985 | Ward | 600/549 |
| 4,715,727 | 12/1987 | Carr | 374/122 |
| 4,747,412 | 5/1988 | Bloch | 128/736 |
| 4,763,112 | 8/1988 | Hsieh | 340/573 |
| 4,844,076 | 7/1989 | Lesho et al. | 128/631 |
| 5,033,864 | 7/1991 | Lasecki et al. | 374/151 |
| 5,062,432 | 11/1991 | James et al. | 128/736 |
| 5,386,831 | 2/1995 | Gluck | 128/664 |
| 5,523,842 | * 6/1996 | Simkins et al. | 340/573 |
| 5,844,862 | * 12/1998 | Cocatre-Zilgien | 600/549 |
| 5,853,005 | * 12/1998 | Scanlon | 128/662.03 |
| 5,855,550 | * 1/1999 | Lai et al. | 600/300 |
| 5,913,827 | * 6/1999 | Gorman | 600/509 |
| 5,938,619 | * 8/1999 | Dogre Cuevas | 600/549 |

FOREIGN PATENT DOCUMENTS

93/16636 * 9/1993 (WO) .................................. 600/549

* cited by examiner

Primary Examiner—John P. Lacyk
Assistant Examiner—Charles Marmor, II
(74) Attorney, Agent, or Firm—Malloy & Malloy, P.A.

(57) ABSTRACT

A monitoring assembly designed to continuously monitor the temperature of a patient, such as but not exclusively limited to a child, and including a sensor assembly having at least a first sensor structure removably attachable to the patient in preferably direct contact and engagement with the skin at a predetermined location. A display assembly includes a first display structure associated with a remotely located casing which may vary in size and configuration and further wherein the display assembly includes a second display unit mounted on the housing which is removably attachable to the patient being monitored. A control assembly includes operative, electronic control circuitry interconnecting the sensor assembly to the display assembly such that the temperature readings are converted to a visual display on both the first and second display structures and further wherein a control assembly includes a transmission assembly designed for wireless communication between the remote casing and the patient mounted housing for purposes of activating a reset assembly and/or transmitting temperature data and sound from the patient to the remotely located casing.

26 Claims, 5 Drawing Sheets

TEMPERATURE MONITORING ASSEMBLY

BACKGROUND OF THE INVENTION

1. Field of the Invention

The present invention is directed towards a monitoring assembly for the continuous monitoring of a temperature of a small child or other patient, wherein the resulting temperature data may be displayed on a first display structure located remotely from the child and concurrently on a second display structure located on a housing removably attachable to the child. Sound emanating from the patient or from the vicinity of the patient may also be selectively or continuously monitored.

2. Description of the Related Art

In modern day medical practice it is common for a patient being cared for in a hospital or like medical facility to undergo continuous physiological monitoring such that medical personnel can observe a patient's condition and provide emergency treatment when needed such as when a patient's medical condition suddenly worsens. Typically, the monitoring instruments used in hospitals are of complex design and structure and are structured to concurrently monitor a plurality of patient functions, such as but not limited to, temperature, heartbeat, blood pressure, etc.. While it is to be assumed that such complex instrumentation is functional for its intended purpose it is also well recognized that the complexity of such instrumentation significantly adds to its expense and necessitates its operation only by trained medical personnel. Such instruments are normally electrically powered from a conventional "built-in" power source, rather than by batteries, and further, include a large number of analog instrumentations and electronic components contained in a relatively large housing or casing of considerable size and weight. Also, in typical fashion, a plurality of electrical wires extend from the main unit for attachment to various locations on the patient's body to measures the physiological parameters, of the type set forth above. Because of the relatively large size, extensive wiring requirements, high power consumption, and complexity of operation, such instruments are normally only adapted for use in hospitals or like medical treatment facilities and are not designed for use in a home or like domestic environment, where the illness of a patient, particularly a child, is not necessarily critical or overly serious.

For relatively minor illnesses such as, but not limited to, influenza, the common cold, and various symptoms associated therewith, a patient, particularly small children, are normally treated at home, wherein such treatment comprises bed rest and possibly, the administration of certain prescription drugs for a relative short, predetermined period of time. During the treatment of even minor illnesses of the type set forth above, it is highly beneficial to observe the patient's temperature. Children, in particular, have a tendency to demonstrate relatively high temperatures over a very short period of time when suffering from even the most minor of illnesses. However, rapid and significant increase in the body temperature of a patient of any age is reason for concern and is frequently indicative of the occurrence of an emergency situation that may require emergency treatment by trained medical personnel. Conventional home treatment usually involves the taking of a patient's temperature periodically throughout the day or evening using conventional electrical or mechanical thermometers. It is obvious, that while this technique may be adequate under certain circumstances, it also has certain disadvantages, which in the event of the need for emergency treatment, could result in the patient passing into a life threatening condition, without the knowledge of a caretaker, parent, etc. One such recognized disadvantage is the inability to monitor the temperature of a patient on a continuous basis, especially during the night or while sleeping. As set forth above, continuous monitoring of body temperature may be particularly important in children which frequently demonstrate temperature "spikes" well above the normal range. The onset of such increased temperatures, if allowed to go unobserved, could result in permanent damage to a patient, and particularly to a child of a very young age who may not be able to communicate the existence of a potentially dangerous condition directly to the parent or caretaker.

Based on the above, there is a need for medical instrumentation which is uncomplicated in its design and method of operation and which is specifically capable of being used in the home for purposes of the continuously monitoring of body temperature even while the patient is sleeping. Such improved medical instrumentation should also be capable of allowing the continuous observation of temperature data of a patient being monitored, at a remote location such that a remote unit or casing can be dimensioned and configured to be either carried on the person of, an observer or positioned or located at a convenient, readily accessible site. Improved medical instrumentation of the type referred to should also be capable of monitoring not only the temperature of the patient, but any sounds the patient makes or any sounds emanating from the vicinity of the patient, wherein any such sounds are transmitted to the remote unit for purposes of more completely monitoring the overall condition of the patient.

SUMMARY OF THE INVENTION

The present invention is directed to a monitoring assembly designed to continuously monitor the body temperature of a patient, such as a small child, particularly, but not exclusively, while the patient is undergoing bed rest or is sleeping, and further wherein the monitoring assembly of the present invention may also be adapted for use as a one-way or two-way "intercom" capable monitoring sounds made by the patient or coming from the patients room or surroundings.

More specifically, the monitoring assembly of the present invention comprises a sensor assembly including at least a first sensor structure mounted on or connected to a housing removably attachable to the patient's body such as about the wrist. The first sensor structure is disposed in direct physical contact with an exterior skin portion of the patient.

The monitoring assembly of the present invention also comprises a display assembly including a first display structure mounted on a casing which may be remotely located from the patient as well as the portion of the sensor assembly connected directly to the patient. The remotely located casing may assume a variety of different structural dimensions and configurations and in one embodiment, to be described in greater detail hereinafter, may be sufficiently sized to be mounted on the person of an observer such as a parent, caretaker, etc. The display assembly further includes a second display structure mounted on the housing which is attached to the patient. Both the first and second display structures are cooperatively designed to visually display the sensed temperature data on a concurrent basis. Thereby one or more observers are able to determine the current temperature of the patient by observing the housing connected directly to the patient or by observing the first display structure-on the remotely disposed casing.

The monitoring assembly of the present invention also includes a control assembly including operative, electronic circuitry serving to interconnect the at least one sensor structure to the display assembly as well as to control and regulate the communication of data between the sensor assembly and the display structure mounted on the housing attached to the patient as well as the display structure mounted on the remotely disposed casing. Accordingly, the control assembly of the present invention further includes a transmission assembly which provides wireless communication, such as by frequency modulated (FM) transmission, between the patient mounted housing and the remotely located casing.

As will be explained in greater detail hereinafter, the transmission assembly is further structured to detect sound emanating from the patient and/or from the patient's vicinity and transmit such sounds to the remotely located casing. The transmission assembly thereby serves as an at least one-way intercom system in order that the caretaker or person observing the patient can more completely monitor the patient and continuously detect conditions other than the patient's temperature. For example, if the patient is in distress or otherwise requires immediate assistance, such as by falling out of bed, the patient's situation would not necessarily be indicated by a rise in body temperature. However, the remotely located caretaker would be fully informed of such an emergency condition by monitoring the sounds from the patient's room or vicinity.

Additional embodiments which may be considered a part of the monitoring assembly of the present invention is the provision of the sensor assembly including a second sensor structure removably attached to the patient in spaced relation to the first sensor structure. The first and second sensor structures are each designed to continuously monitor the body temperature of the patient and each provide independent temperature data which in accordance with the design and structure of the control assembly, is concurrently calculated and "averaged" such that a single temperature is transferred to both the remotely located first display structure and the second display structure mounted on the patient.

Yet another embodiment of the present invention comprises the sensor assembly including a motion detector connected to a predetermined portion of the user's body and specifically structured to detect tremulous motion such as when the patient demonstrates tremors or shivers commonly associated with, unusually high temperatures, as well as other symptoms associated with a variety of medical conditions.

Therefore, features of the monitoring assembly of the present invention include a reliable, low cost and efficient medical instrumentation capable of being used without extensive medical training and particularly adaptable for use at home on patients, including but not limited to children, which appear to demonstrate relatively minor illnesses or other medical conditions, wherein proper treatment would best include the continuous monitoring of the body temperature of the patient. In addition, the improved monitoring assembly of the present invention is capable of the continuous monitoring by visually displaying sensed temperature data of a patient, both at the site of the patient, as well as at a remote location. In addition an alarm feature may be incorporated within the monitoring assembly so as to alert an observer, caretaker, parent, etc. of the existence of the increase in a patient's temperature beyond a certain, predetermined, or recognized dangerous level.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying drawings, the present invention is directed to a monitoring assembly including a first unit, generally indicated as 10. The first unit 10 preferably includes a housing 12 at least temporarily secured to a mounting or attachment structure. The mounting structure, which may include a clip, adhesive patch, or an elongated strap 14 is dimensioned and configured to be removably attached to a patient, such as about the wrist, arm or other portions of the user's body. The illustrated strap 14 embodiment includes a connector comprising first and second removably attachable, connector components 16 and 18 which are preferably, but not necessarily, in the form of a hook and loop type fastener. Naturally, other type of connector components may be utilized such as a buckle, snap-type connectors, tie, draw string, adhesive, etc.

Figures 2, 3:
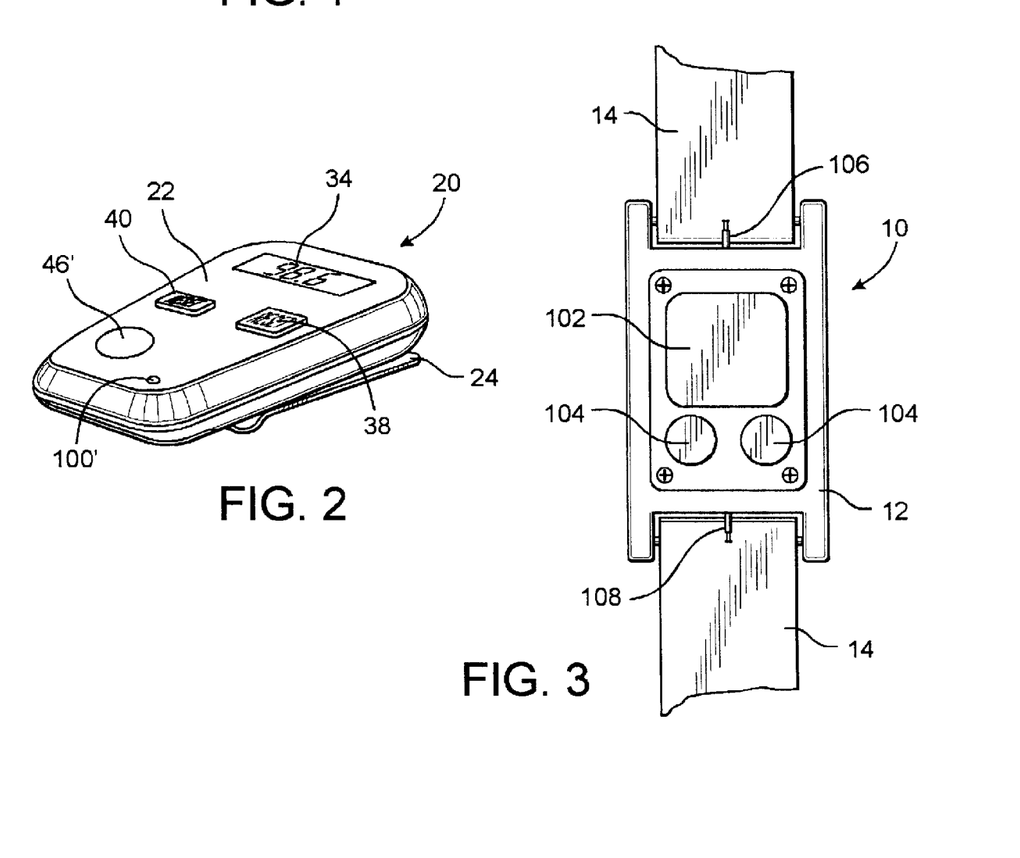
FIG. 2 is a perspective view of a remote casing comprising a portion of the monitoring assembly of the present invention.
FIG. 3 is a rear view in partial cutaway showing details of the embodiment of FIG. 1.

With reference to the embodiment of FIG. 2, the monitoring assembly of the present invention may also comprises a remote unit, generally indicated as 20. The remote unit 20 preferably includes a casing, such as a remote casing 22, which may be dimensioned and configured to be small in size and light in weight. Accordingly, the remote casing 22 may be easily held, such as in a pocket or hand, or as in the illustrated embodiment, can be structured to be removably attached to the clothing of an observer, caretaker, etc. by the utilization of a hook, clamp, pin or as shown, a spring biased clip 24. Also, the remote unit 20 is preferably designed to be powered by relatively small batteries or another small power source so as to be self contained and thereby assuring its portable nature.

Figure 5:
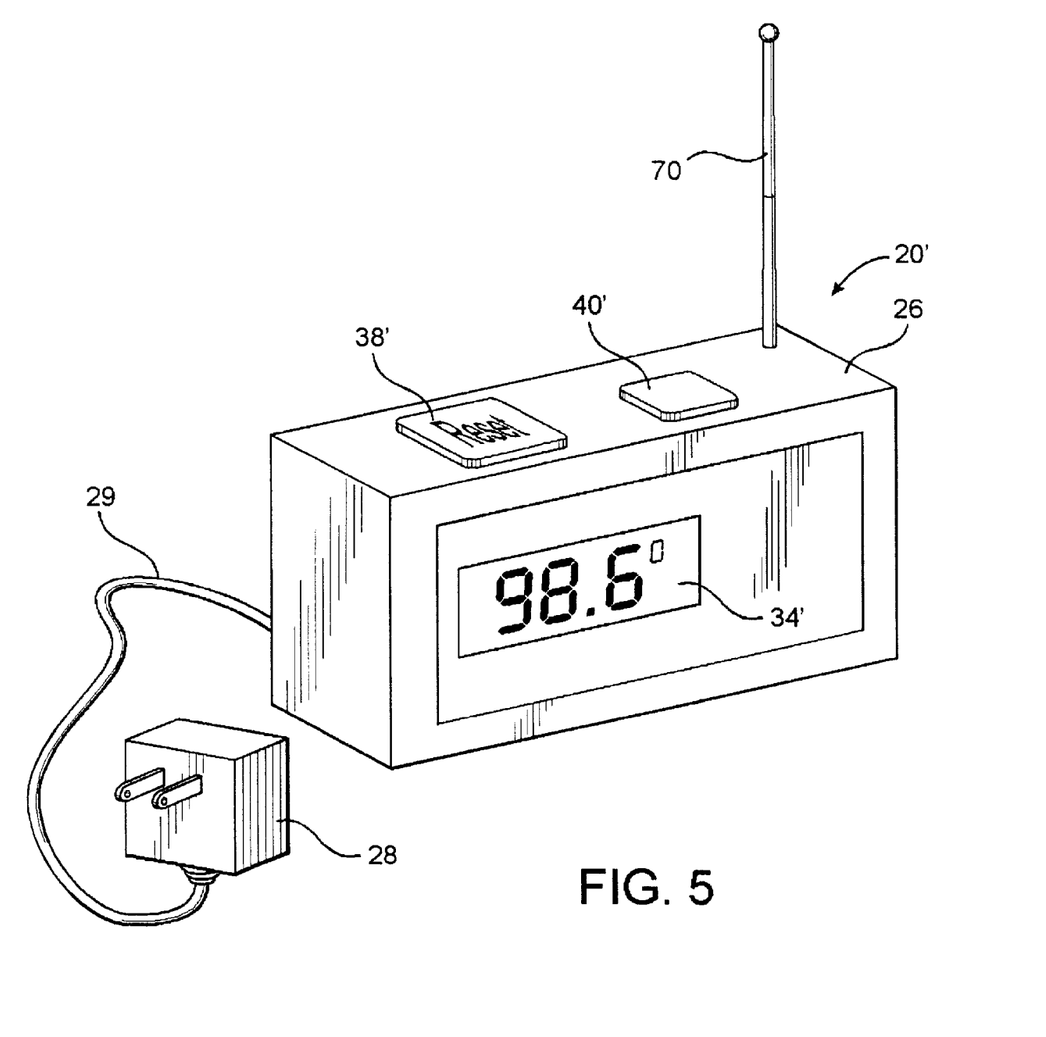
FIG. 5 is a perspective view of yet another embodiment of the remote casing structure.

Further, as illustrated in FIG. 5, with reference to another embodiment of the present invention, the monitoring assembly may also include a second remote unit 20'. More specifically, the second remote unit 20' is also preferably disposed in a casing, such as alternate casing 26 which in the illustrated embodiment includes a significantly larger dimension and configuration than that of the remote casing 22. The alternate casing 26 is preferably structured to be disposed for observation at a central or other convenient location, rather than being carried on the person of an observer, caretaker, etc., as is the embodiment of the remote unit 20 of FIG. 2. Because of its preferred stationary nature, the second remote unit 20' is preferably electrically powered by a plug and/or transformer 28 removably connected to a conventional power source that exists in the home or other location where the monitoring assembly of the present invention is being used and will be located. Of course, a battery or other power source may also be utilized in connection with the second remote unit 20'.

The monitoring assembly of the present invention further comprises a sensor assembly. The sensor assembly preferably includes a first sensor structure 30 associated with the first unit 10. The first sensor structure 30 is preferably mounted on or connected to the housing 12, such as by the strap 14, and is secured by applicable means in the position shown, so that the first sensor structure 30 is disposed in operative engagement, such as by direct physical contact, with an exterior skin portion of a patient's body. As will be explained in greater detail hereinafter, particularly with regard to FIGS. 6 and 7, the first sensor structure 30 is preferably in the form of a quartz crystal or quartz oscillator crystal which is connected to a display assembly by means of an electrical conductor 32 formed on the interior of one or both of the mounting bands 14. As will also be explained hereinafter with particular reference to FIGS. 6 and 7, the wire or conductor 32 defines a portion of a control assembly including operative, electronic control circuitry serving to operatively interconnect and define the various components of the monitoring assembly.

A display assembly is also preferably incorporated with the monitoring assembly of the present invention. In particular, the display assembly includes a first display structure 34, preferably formed on the remote unit 20, and a second display structure 36, preferably mounted on the housing 12 attached directly to the patient, as set forth above. Both the first display structure 34 and the second display structure 36 are designed to visually display the temperature data sensed by the first sensor structure 30. In addition, the first and second display structures 34 and 36 of the display assembly are interconnected or otherwise operatively designed to concurrently display the sensed temperature data both at the remote location of the remote unit 20 and at the site or location of the patient to which the housing 12 is attached.

The control assembly of the present invention further comprises a reset assembly which will be described in detail by reference to the schematic diagrams of FIGS. 6 and 7. The reset assembly comprises a first reset structure mounted on or within the remote unit 20 and operable by exteriorly accessible buttons or like activating members 38 and 40. Similarly, the reset assembly also comprises a second reset structure mounted on or within the housing 12 and being operable by an exteriorly accessible reset button 42.

First, with reference to FIG. 2, the reset button 38 is preferably structured to be manually activated, so as to "reset", at least the digital readout of the first display structure 34 and effectively clear, remove or erase the temperature data displayed thereby. The pushing of the reset button 38 will further reset the first display structure 34 back to a zero based temperature data reading in order to verify the accuracy of the temperature data being displayed. Moreover, the first reset structure associated with the remote unit 20 further includes a second reset button 40 which, when depressed or otherwise actuated, serves to also reset the second display structure 36 by "removing" or "erasing" the display temperature data thereon and replacing it with a "zero based" temperature reading such that the temperature data constantly being sensed by the first sensor structure 30 may be concurrently displayed after reset, on both the first display structure 34 and the second display structure 36. Of course, it is understood that even after being erased, a maximum temperature or temperature history may be stored by the device. Also, a single reset button may be provided to simultaneously reset both displays.

Looking now to FIG. 5, when the embodiment of the second remote unit 201 is utilized instead of the remote unit 20, first and second reset buttons as at 38' and 40'are provided at the second remote unit 20' to operate in the same manner as just described with regard to the remote unit 20. Additionally a temperature display 34, may also be provided. The specific operative features of the reset assembly including the first and second reset structures as well as the communication between the first reset structure associated with the remote unit 20 and the second reset structure associated with the housing 12 may best be described with reference to a transmission assembly which is also to be considered an operative component or portion of the control assembly.

Figure 6:
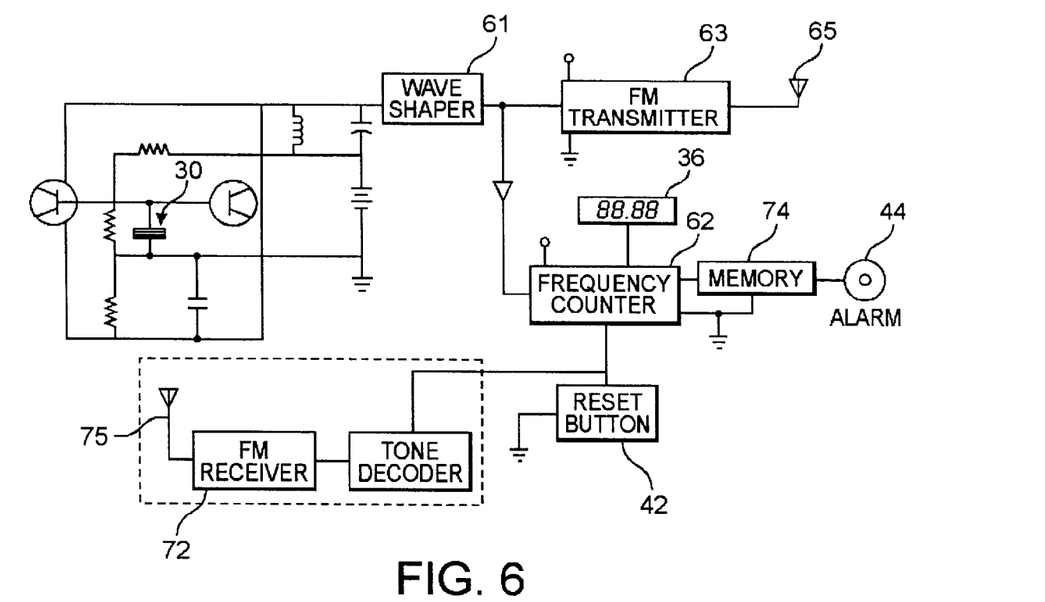
FIG. 6 is a schematic, circuit diagram of a portion of the control assembly of the monitoring assembly of the present invention.
Figure 7:
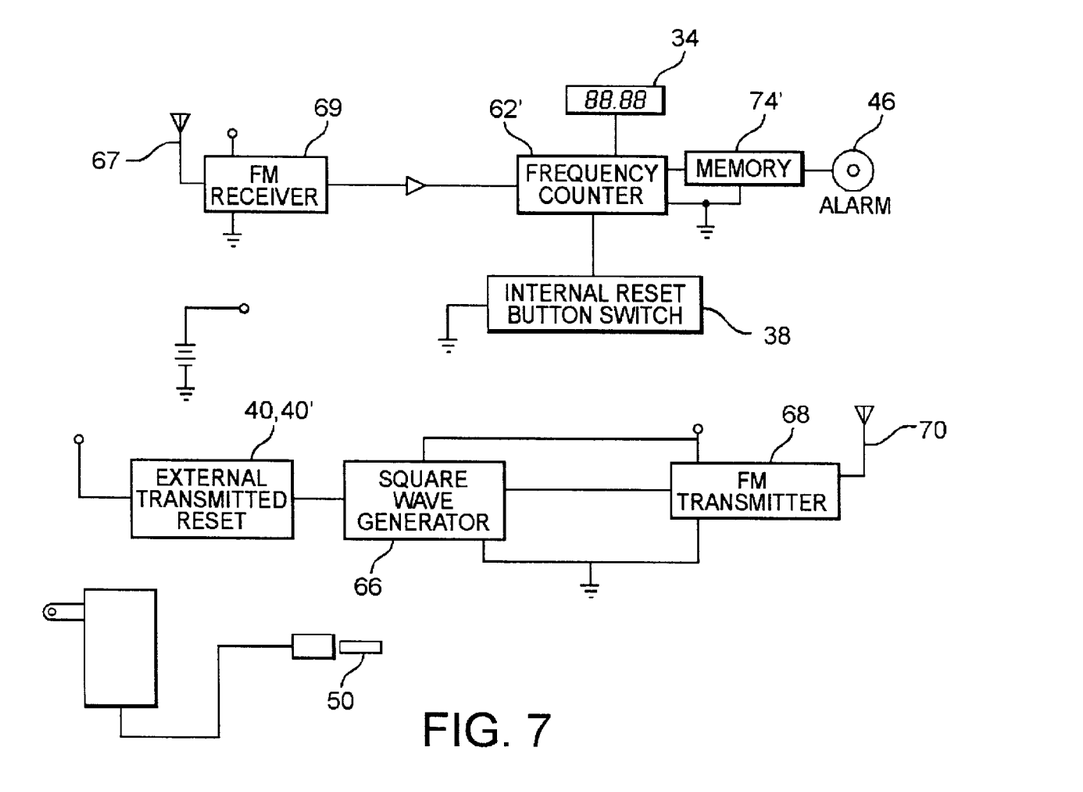
FIG. 7 is a schematic, circuit diagram of additional portions of the control assembly of the present invention associated with the embodiments of FIGS. 2 and 5.

Yet another feature of the monitoring assembly of the present invention is the provision of an alarm assembly, which may also be considered a part of the control assembly in that it is activated through operation of the operative, electronic control circuitry associated with the control assembly and shown in detail in FIGS. 6 and 7. More specifically, the alarm assembly is interconnected and/or defined through the various electronic control circuitry components, as described hereinafter, so as to generate an indicator signal, preferably such as an audible alarm through a first alarm unit 44 which may include a miniaturized microphone and/or speaker 44' formed on the housing 12 and capable of detecting and transmitting audible sound, in addition to the audible indicator signal generated by the first alarm unit 44. Such additional sounds may include sounds made directly by the patient or emanating from the general vicinity of the patient, including but not limited to the audible alarm signal. A second alarm unit 46 preferably includes a miniaturize speaker and/or microphone 46' formed on the remote unit 20 and structured to generate audible sound detected by the microphone 44'. Sound is thereby transmitted between the housing 12 and the remote casing 20 by means of a transmission assembly utilizing frequency modulated (FM) transmission thereby allowing the assembly of the present invention to function as either a one-way or two-way intercom. Similar provision can be provided if the second remote unit 20' is utilized instead of the remote unit 20 specifically with regard to the differences between the embodiments of FIGS. 2 and 5.

The alarm assembly is activated when the temperature data fed from the first sensor structure 30 indicates a body temperature at or in excess of a predetermined set temperature. Such predetermined or preset temperature would be a temperature which would be critical or "dangerous" to a child or a patient, being monitored, regardless of the age thereof. Alternatively, the alarm assembly may also include a visual and/or tactile/vibrating alarm instead of, or in conjunction with the preferred audible alarm. Also, the individual alarm assemblies may be partially or variably turned off, such as if a user only wishes the remote portions to be signalled, thereby not disturbing or alarming the patient.

Figure 1:
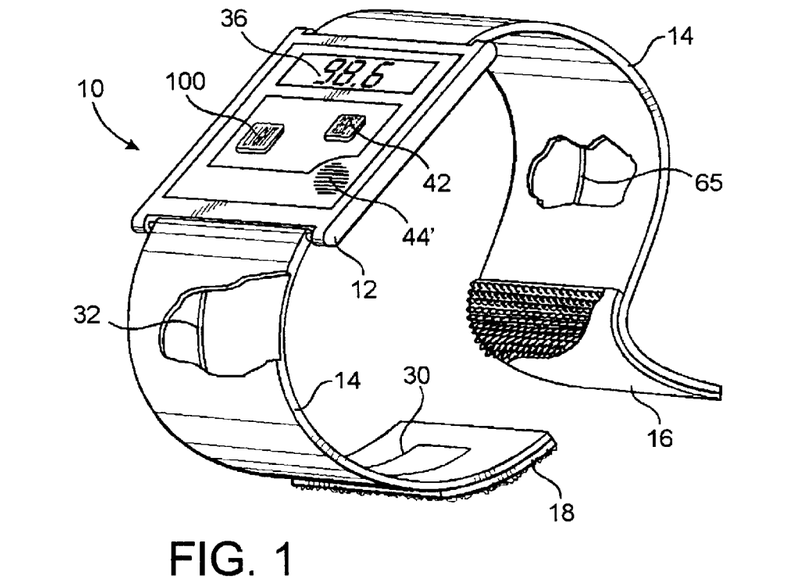
FIG. 1 is a perspective view of a housing portion of the monitoring assembly of the present invention designed to be removably attached to a patient's body.
Figure 4:
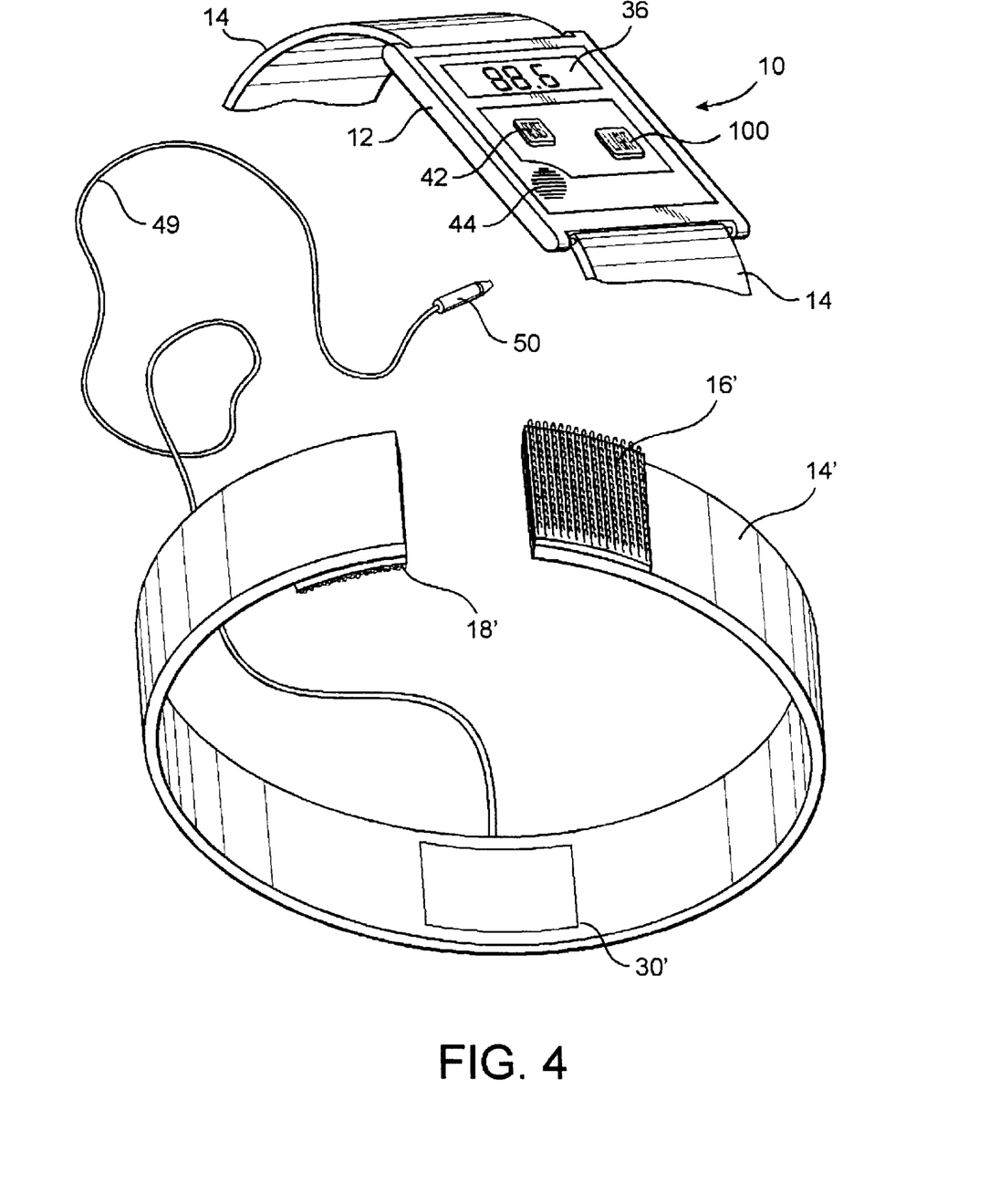
FIG. 4 is a perspective view in partial cutaway of another embodiment of the monitoring assembly of the present invention in unassembled form.

With regard to FIG. 4, another embodiment of the present invention includes the sensor assembly comprising a second sensor structure 30'. The second sensor structure 301 is preferably secured to a connecting band or like mounting structure 14' having coupling or connector members 16' and 18' which, as with the mounting strap 14 of the embodiment of FIG. 1, may be a hook and loop type fastener or a variety of other coupling or connecting members. The second sensor structure 301 is mounted on the mounting structure 14' in a manner so as to be disposed in operative engagement, such as direct contact or engagement, with an exterior skin portion of the patient being monitored. Further, the second sensor structure 30' is preferably disposed a spaced apart distance from the first sensor structure 30 associated with the first unit 10 and housing 12 as shown in FIG. 1. By way of example only, the first unit 10 may be mounted about the wrist or arm of the patient and the second sensor structure and its associated mounting strap 14' may be mounted about an opposite arm, ankle, limb or other part of the user's body disposed a spaced distance from the housing 12. Direct interconnection between the second sensor structure 30'and the operative, electronic circuitry as shown in FIGS. 6 and 7 preferably occurs by means of an elongated conductor in the form of an insulated wire 49 having a plug 50 secured to one end. The plug 50 may be removably disposed within an appropriate socket (not shown for purposes of clarity) formed in the housing 12. Of course, other remote transmission structures could also be incorporated to avoid the use of wires.

With reference to the circuit diagrams of FIGS. 6 and 7, FIG. 6 relates to the schematic circuit diagram on the first unit of the embodiment of FIG. 1 wherein transistors Q-1 and Q-2 work in conjunction with the first sensor structure 30 in the form of a quartz crystal XY1. The first sensor structure 30, in the form of the quartz crystal XY1, forms an oscillator circuit with the aforementioned transistors Q-1 and Q-2 having a resonant frequency determined by the transistors, quartz crystal, resistors and capacitors shown in the schematic diagram of FIG. 6 in addition to coil L-1. The primary function of the quartz crystal XY1 in this circuit is to provide an exact, accurate frequency of the oscillator. The quartz crystal XY1 also serves as the temperature measuring device in this circuit and is mounted on the first unit 10 in the wrist band 14, as indicated above and as shown in detail in FIG. 1. The output frequency of the oscillator circuit is sent through a wave shaper 61 that preferably converts the generated sine wave signal into a square wave signal as indicated. The resulting square wave signal is sent or delivered to preferably a first FM transmitter 63 comprising a part of the transmission assembly, referred to above. An antenna as at 65 serves to transmit the square wave signal to the antenna 67 connected to a first FM receiver 69 whioh is part of the circuit diagram of FIG. 7 and represents that portion of the operative, electronic control circuitry of the control assembly of the present invention associated with either the remote unit 20 and/or the second remote unit 20', depending upon the particular embodiment utilized. Again with reference to FIG. 6, the resulting square wave signal in addition to being transferred to the first transmitter 63 is also directed to the frequency counter 62. The frequency counter 62 processes the square wave signal and is connected to the second display structure 36 which provides the visual display of the temperature data sensed by the first sensor structure 30. Concurrently, the square wave signal transferred from the first FM transmitter 63 to the first FM receiver 69 displays the sensed temperature data on the first display structure 34 after the transmitted square wave signal is processed by the frequency counter 62' associated with the circuitry of either the remote unit 20 or second remote unit 20'.

Also with regard to FIGS. 6 and 7, each portion of the control circuitry respectively represented thereby, includes a part of the aforementioned reset assembly. More specifically, in the embodiment of FIG. 6, the second reset structure schematically represented by the reset button 42 is connected to the frequency counter 62 for complete reset of the second display structure 36 in order to check the accuracy of the temperature data being read. With regard to FIG. 7, the internal reset button 38 is similarly connected to the frequency counter 63 which in turn is connected to the first display structure 36. Each of the digital frequency counters 62 and 62' preferably have a seven segment, liquid crystal display as at 36 and 34 respectively associated therewith. Further, each of the frequency counters 62 and 62' are designed to convert the counted oscillator frequency into digits (numerical character display) that represent the sensed temperature data. Accordingly, whenever the body temperature changes, the frequency of the oscillator circuit, as described in detail with reference to FIG. 6, changes and the frequency counter displays the result in the frequency change in either Fahrenheit or Celsius (dependent upon the manufacturer's design decision). By way of example, an average rate of measurement may be considered to be 9 Hz. equals one fahrenheit degree as a conversion factor. It is emphasized that this conversion factor is stated to give an approximate frame of conversion and is not necessarily an exact conversion rate.

With reference to the schematic circuit diagram of FIG. 7, the schematic diagram shown is the same for the hand-held or mobile unit disclosed in FIG. 2 as that for the base unit shown in FIG. 5. The obvious exception being that the unit of FIG. 2 is preferably powered by self-contained batteries whereas the embodiment of FIG. 5 is preferably powered by 120 volt AC which is transformed into 3 volt DC current. As set forth above, the first unit 10 shown in FIG. 1 as well as the remote units shown in FIGS. 2 and 5 are structured such that a respective reset button 38 and 38' of the embodiments of FIGS. 2 and 5 and reset button 42 of the embodiment of FIG. 1 may be activated so as to "reset" the individual display structures associated therewith. However, in the embodiments of FIGS. 2 and 5 the remote unit 20 and second remote unit 20' preferably have an additional reset button 40 and 40' respectively. The activation of the external reset buttons 40 and/or 40' activates a square wave oscillator generator 66 which is transmitted through a second FM transmitter 68, mounted on the remote unit 20 or second remote unit 20', by way of a transmitting antenna 70 to a second FM receiver 72 comprising a part of and mounted within the housing 12 of the first unit 10 of the embodiment of FIG 1. An appropriate receiving antenna 74 is connected to the second FM receiver 72. The generated square wave signal is then transferred to a tone decoder network which responds only to the transmitted square wave signal from the second FM transmitter 68. The result is a switched signal to the frequency counter circuit 62 located on the first unit 10 and shown by way of the detailed electronic, operative circuitry in FIG. 6.

In addition to the above, the frequency counter circuits, including frequency counters 62 and 62', are preferably of the type which include a memory circuit as at 75 and 74' that operate in conjunction with a differential circuit that performs continual checks in the difference in frequency changes. This in turn is connected to the aforementioned alarm assembly setting off an alarm within the first alarm unit 44 and the second alarm unit 46 which may be considered at least a part of the frequency counter as at 62 and 62', respectively. The frequency counters 62 and 62', when activated, are reset allowing a fresh frequency count and a differential frequency check to be made.

As indicated above, the control assembly of the present invention further includes a transmission assembly comprising the aforementioned first FM transmitter 63 and second FM receiver 72 both of which are mounted on the housing removably attached directly to the patient. The transmission assembly of the present invention also includes the aforementioned second FM transmitter 68 and first FM receiver 69 disposed on the remote unit generally indicated as 20 (or alternatively on the remote casing 26' of the embodiment of FIG. 5). It is further emphasized that the transmission assembly also includes the speaker/microphone structure 44' associated with the alarm structure 44 mounted on the housing 12 secured to the patient. Similarly, the speaker/microphone structure 46' is mounted remotely from the patient, on the remote unit 20. The transmission assembly therefore is structured to transmit audible sound detected by the microphone 44', by means of the first transmitter 63 to the first receiver 69 on casing 20 where it is generated by speaker/microphone 46', represented respectively in FIGS. 6 and 7. The detection of audible sound either generated by the patient or alternately emanating from the general vicinity of the patient, will thereby allow a care taker to more completely monitor the overall condition of the patient and determine a continuous temperature reading as well as other conditions of the patient, such as but not limited to, the patient falling from the bed or otherwise calling out, such as when the patient is in extreme pain.

Based upon the preceding, it is understood that the illustrated embodiments of the control circuitry and components set forth are merely illustrative a preferred embodiment, but should not be considered as exhaustive or determinative of the ultimate circuitry and components used within the production of the present invention. Along these lines, a variety of different control assembly configurations could be equivalently configured utilizing alternate and/or advanced circuitry components.

Figure 8:
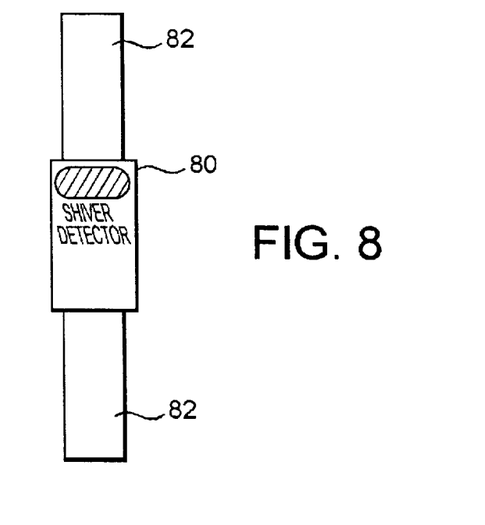
FIG. 8 is a front plan view of yet another embodiment of the present invention.
Figure 9:
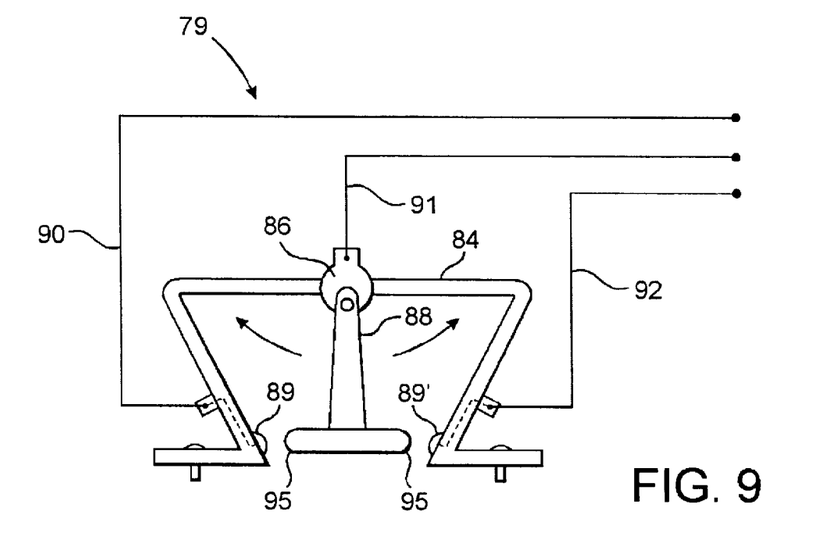
FIG. 9 is a schematic representation of the structural and operative components of the embodiment of FIG. 8.
Figure 10:
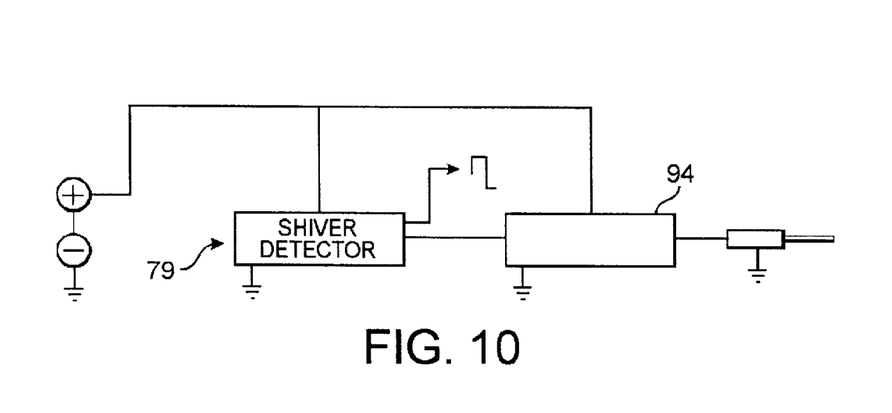
FIG. 10 is a schematic, circuit diagram of a portion of the control assembly associated with the embodiment of FIGS. 8 and 9.

Yet another feature of the present invention is shown in the embodiments of FIGS. 8, 9 and 10, and is directed to a generally 29. The motion detector preferably includes a housing as at 80 mounted on a wrist band or like mounting structure 82 and which includes, as best shown in FIG. 9, a support frame 84 having at least a first contact switch 86. A mechanical portion of the contact switch preferably includes a movably mounted pendulum member 88 formed of a conductive material. The overall switching circuit shown in FIG. 9 also includes a second pair of contact switches as at 89 and 89' both connected in circuit to the first contact 86 by the correspondingly disposed conductors 90, 91 and 92. Further, a biasing element such as a spring may be associated with the pendulum member 88 so as to initially bias or otherwise maintain or position the pendulum member 88 in spaced relation to each of the contacts 89 and 89'. However, when a certain, predetermined motion or movement, such as a tremulous motion is sensed, the outwardly extending lobes 95 of the pendulum member 88 repetitively engage separated, spaced apart ones of the contacts 89 and 89'. The detected tremulous motion would be indicative of shivers or tremors being experienced by the patient being monitored. Further, the tremulous motion being detected would have to be sufficient to overcome the biasing force exerted on the pendulum member 88 by the aforementioned biasing spring (not shown for purposes of clarity) which has a tendency to maintain the pendulum member 88 in spaced relation to both the contacts 89 and 89'. During a situation where a patient has the tremors, chills, shivers, etc., the pendulum member 88 will move back and forth rapidly making electrical contact with the contact switches 89 and 89' producing an electrical square wave having a frequency of generally between 20 hertz and 60 hertz. This embodiment is beneficial to differentiate normal movement of the patient from a tremulous movement.

With reference to FIG. 10, a tone decoder IC network 94 is set to respond to the aforementioned frequency of between 20 and 60 hertz and is connected to the output of the motion detector and produces an "on" signal whenever shivering or the indicated tremulous motion is detected. The provided electronics in the control circuitry portion as shown in FIG. 10 transmits an "alert" condition to the caretaker or observer which may be indicated by an audible alarm issuing from the miniaturized speakers, or a visual or tactile alarm as may be desired by a user.

Finally, with reference to FIGS. 1, 2 and 3, other structural and/or operative features of the present invention include an indicator light as at 100 indicating the activation or operability of the monitoring system of the present invention. Also, and with reference to FIG. 3, a certain portion of the electronic control circuitry may be housed within a sealed or closed compartment as at 102 mounted on the wrist or other external portion of the patient's body. Moreover, the batteries used to power the first unit 10 may be "button" type batteries 104 as shown so as to maintain a compact nature of the device. Electrical connections as at 106 and 108 may be provided so as to interconnect the antenna 65 as well as the electrical conductor 32 to the housing 12 and the various operative components therein.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A monitoring assembly to continuously determine temperature of a patient, said monitoring assembly comprising:

a) a sensor assembly including at least a first sensor structure to be disposed in operative engagement with an exterior portion of the patient's body;

b) said first sensor structure disposed and structured to sense a temperature of the patient on a continuous basis;

c) a display assembly including at least a first display structure located remotely from said first sensor structure;

d) said first display structure being responsive to said first sensor structure and structured to visually display temperature data determined thereby;

e) a control assembly operatively interconnecting said first sensor structure to said display assembly; and f) said control assembly further including a transmission assembly interconnected to said sensor assembly and structured to transmit the temperature data from said sensor assembly to said first display structure;

g) a second display structured to be disposed on the patient, said second display structure responsive to said first sensor structure and structured to visually display the temperature data on a continuous basis concurrently with said first display assembly; and h) a reset assembly including a first reset structure remotely disposed from the patient, said first reset structure operatively connected to said display assembly at least partially by said transmission assembly so as to concurrently reset both said first and said second display structures to a new temperature data reading.

2. A monitoring assembly as recited in claim 1 wherein said reset assembly further comprises a second reset structure structured to be disposed on the patient and operatively connected to said second display structure, said second reset structure being structured to reset at least said second display structure to a new temperature data reading.

3. A monitoring assembly as recited in claim 1 wherein said transmission assembly comprises a first transmitter structured to be disposed in operative proximity to the patient and a first receiver disposed at a location remote from the patient, said first transmitter and said first receiver cooperatively structured to transmit the temperature data determined by said first sensor structure to said first display structure.

4. A monitoring assembly as recited in claim 3 wherein said transmission assembly further comprises a second receiver and a second transmitter, said second receiver disposed in operative proximity to the patient and said second transmitter structured to be disposed at a location remote from the patient, said second transmitter and said second receiver cooperatively structured to transmit control signals from the remote location to said display assembly including control signals to reset said first display structure to a new temperature data reading.

5. A monitoring assembly as recited in claim 1 wherein said first reset structure is operatively connected to said first display structure so as to concurrently reset both said first and said second display structures to a new temperature data reading.

6. A monitoring assembly as in claim 5 wherein said first and said second transmitters are FM transmitters and said first and said second receivers are FM receivers.

7. A monitoring assembly as in claim 1 wherein said transmission assembly further comprises a microphone connected to said first transmitter and a speaker connected to said first receiver, said microphone and said speaker cooperatively structured with a remainder of said transmission assembly to communicate audible sound from a vicinity of the patient to a location remote from the patient.

8. A monitoring as recited in claim 1 wherein said first sensor structure comprises a quartz oscillator crystal structured to be mounted in direct contact with the skin of the patient, said quartz oscillator crystal connected to and defining a part of a said control assembly.

9. A monitoring assembly as recited in claim 1 wherein said control assembly further comprises an alarm assembly responsive to said first sensor structure and structured to generate a warning signal upon the temperature data equalling or exceeding a predetermined temperature.

10. A monitoring assembly as recited in claim 9 wherein said alarm assembly is further structured to generate an audible alarm signal at the location of the patient and concurrently at a location remote therefrom.

11. A monitoring assembly as recited in claim 1 wherein said sensor assembly further comprises a second sensor structure structured to be mounted on the patient in spaced relation to said first sensor structure, said second sensor structure structured to sense temperature of the patient on a continuous basis.

12. A monitoring assembly as recited in claim 11 wherein said control assembly is disposed in interconnecting relation to said first and said second sensor structures and cooperatively structured therewith to average temperature data delivered by both said first and said second sensor structures and transmit the resulting temperature data to said display assembly.

13. A monitoring assembly as recited in claim 12 wherein said first and said second sensor structures each comprise a quartz oscillator crystal.

14. A monitoring assembly as recited in claim 1 wherein said sensor assembly further comprises a detector structure structured to be operatively associated with the patient and mounted to detect tremulous motion of the patient; and an alarm connected to said detector structure and responsive thereto, said alarm structured to generate an indicator signal upon detection of the tremulous motion.

15. A monitoring assembly to continuously monitor the temperature of a patient, said monitoring assembly comprising:

a) a housing removably structured to be attached to the patient being monitored and including a sensor assembly at least partially mounted thereon, b) said sensor assembly including at least a first sensor structure structured to be disposed in operative proximity with the patient's skin and structured to sense skin temperature on a continuous basis, c) a casing positionable a spaced apart distance from said housing and the patient and including a transmission assembly structured to establish wireless communication between said casing and said housing, d) a display assembly including a first display structure mounted on said casing and a second display structure mounted on said housing, e) said first and said second display assemblies responsive to said first sensor structure and cooperatively structured to concurrently display temperature data from said first sensor assembly on a continuous basis, f) a control assembly including control circuitry mounted in part on both said housing and said casing and operatively interconnecting said first sensor structure to said first and said second display structures at least partially through said transmission assembly;

g) said sensor assembly further including a motion detector structured to be mounted on the patient and structured to detect tremulous motion of the patient, an alarm connected to said motion detector and responsive to generate an indicator signal upon detection of the tremulous motion; and h) said motion detector structured to be removably mounted on the patient in spaced relation to said housing and including a support frame, a first contact movably mounted on said support frame and a pair of fixed contacts secured to said support frame in spaced relation to one another and in engageable relation to said first contact, said first contact disposed and structured to repetitively contact said pair of fixed contacts upon an occurrence of tremulous motion in the patient.

16. A monitoring assembly as recited in claim 15 wherein said control assembly further comprises a reset assembly including a first reset structure mounted on said casing and operatively connected to said first display structure at least partially through said transmission assembly so as to concurrently reset said first and second display structures to display a new temperature data reading.

17. A monitoring assembly as recited in claim 16 wherein said reset assembly further comprises a second reset structure mounted on said housing and electrically connected to said second display structure by said control circuitry, said second reset structure being structured to reset at least said second display structure to a new temperature data reading.

18. A monitoring assembly as recited in claim 17 wherein said transmission assembly comprises a first transmitter and a first receiver respectively-mounted on said housing and said casing, said first transmitter and said first receiver cooperatively structured to transmit the temperature data determined by said first sensor structure to said first display structure.

19. A monitoring assembly as recited in claim 18 wherein said transmission assembly further comprises a microphone mounted on said housing and connected to said first transmitter and a speaker mounted on said casing and connected to said first said microphone and said speaker cooperatively structured with a remainder of said transmission assembly to communicate audible sound from a vicinity of the patient to a location remote from the patient.

20. An assembly as recited in claim 18 wherein said transmission assembly further comprises a second receiver and a second transmitter respectively mounted at said housing and said casing, said second transmitter and said second receiver cooperatively structured to transmit control signals from said casing to said display assembly so as to reset said first display structure to a new temperature data reading.

21. A monitoring assembly as recited in claim 20 wherein said control assembly further comprises a reset assembly including a first reset structure mounted at said casing and operatively connected to said display assembly at least partially through said transmission assembly so as to concurrently reset both said first and said second display structures to a new temperature data reading.

22. An assembly as recited in claim 21 wherein said first reset structure is connected to said first display structure so as to concurrently reset both said first and said second display structures to a new temperature data reading.

23. A monitoring assembly as recited in claim 15 wherein said control circuitry further comprises an alarm assembly responsive to said first sensor structure and mounted at least partially on both said housing and said casing and structured to generate a warning signal upon the temperature data equalling or exceeding a predetermined temperature.

24. A monitoring assembly as recited in claim 15 wherein said sensor assembly further comprises a second sensor structure mounted on the patient in spaced relation to said first sensor structure and designed to sense temperature of the patient on a continuous basis; said control circuitry disposed in interconnecting relation to said first and said second sensor structures and cooperatively structured therewith to average temperature data determined by both said first and said second sensor structures and to transmit the resulting temperature data to said display assembly.

25. An assembly as recited in claim 15 wherein said first contact comprises a pendulum member movably mounted on said support frame, a biasing element connected to said pendulum member for normally biasing said pendulum member in spaced relation to said pair of fixed contacts absent the presence of tremulous motion of the patient.

26. A monitoring assembly as in claim 15 wherein said casing comprises a remote casing having a small, substantially compact configuration dimensioned to be carried on the person of an observer remotely from said housing.

* * * * *